United States Patent [19]
Uemiya et al.

[11] Patent Number: 5,355,428
[45] Date of Patent: Oct. 11, 1994

[54] OPTICAL WAVELENGTH CONVERSION MODULE

[75] Inventors: Takafumi Uemiya; Naota Uenishi, both of Osaka, Japan

[73] Assignee: Sumitomo Electric Industries, Ltd., Osaka, Japan

[21] Appl. No.: 19,187

[22] Filed: Feb. 17, 1993

[30] Foreign Application Priority Data

Feb. 17, 1992 [JP] Japan .................................. 4-029783

[51] Int. Cl.$^5$ .............................................. G02B 6/00
[52] U.S. Cl. ...................... 385/122; 385/33; 385/143
[58] Field of Search ................... 385/122, 141–145, 385/33, 93; 359/326–332

[56] References Cited

U.S. PATENT DOCUMENTS

| | | | |
|---|---|---|---|
| 5,173,962 | 12/1992 | Okamoto et al. | 359/326 |
| 5,189,722 | 2/1993 | Chikuma | 385/122 |
| 5,195,159 | 3/1993 | Uenishi et al. | 385/122 |

*Primary Examiner*—Rodney B. Bovernick
*Assistant Examiner*—John Ngo
*Attorney, Agent, or Firm*—Cushman, Darby & Cushman

[57] ABSTRACT

An optical wavelength conversion module having a laser light source, a lens system for managing the laser beam, and a conversion element. The laser light source generates a beam of laser light of a substantially circular cross-section having an aspect ratio of 1.3 or less. The substantially circular beam is collimated and condensed by the lenses and directed into the core of the conversion element which then emits converted light. The optical wavelength conversion module is small in size and produces converted light with high efficiency.

4 Claims, 3 Drawing Sheets

OPTICAL WAVELENGTH CONVERSION MODULE

RELATED APPLICATIONS/PATENTS

The following applications deal generally with the subject matter of this application: application Ser. No. 07/828,693 now U.S. Pat. No. 5,241,413; application Ser. No. 07/803,998 now U.S. Pat. No. 5,293,444; and application Ser. No. 07/994,353 now U.S. Pat. No. 5,291,568.

BACKGROUND OF THE INVENTION

1. Field of the Invention

This invention relates to an optical wavelength conversion module having a fiber-type optical wavelength conversion element in which light (e.g., laser light) having a fundamental wavelength enters a core of the element and light having a wavelength of the second harmonic of the fundamental wavelength is emitted from the core as the converted light.

2. Description of the Related Art

Optical wavelength conversion modules have been developed to convert source light into light having a wavelength of one half of that of the source light.

The conversion is caused by nonlinear optical effect which occurs when light enters a medium, is polarized, and the wavelength of the emitted light is proportional to a second or higher order term of the electric field of the source light.

Materials which stimulate nonlinear optical radiation are called a nonlinear optical materials. Well known examples of nonlinear optical materials include inorganic materials such as $KH_2PO_4$, $LiNbO_3$ and $KiTaO_3$. Recently, some organic materials have attracted attention because of their nonlinear properties. Typical examples of organic materials having a large nonlinear optical constant are 2-methyl-4-nitrilaniline (MNA), 4-dimetylamino-3-acetoamidonitrobenzene (DAN), and 3,5-dimetyl-1-(4-nitrophenyl)pyrazole (DMNP).

There has recently been a substantial amount of research applying such nonlinear optical materials to fiber optics. The result of these studies has been the development of fiber optic wavelength conversion elements. These elements are used to convert source light to emitted light having a wavelength one half or less than one half of the source light.

In the design of these elements it is important that the source light has a high energy density. The higher the energy density, the higher the conversion efficiency of the element. Also, it is important that the interaction length between the fundamental wave and the harmonic wave is assured. To ensure these characteristics, one of the core and clad of an optical fiber-type element is made of a monocrystalline or a polycrystalline nonlinear optical material and the other of them is made of an amorphous material such as glass, so that the fundamental wave is guided through the core.

FIG. 2 shows an optical fiber conversion element 4 including a core 41 and a clad 42. A fundamental wave 6 enters one end of the core 41 causing a second harmonic wave to be generated and emitted from a second end of the core.

In a fiber-type optical wavelength conversion element, in order to generate wavelength converted light, it is necessary to make the fundamental wave and the generated second harmonic wave coincident with each other. To be coincident, the phases of the waves must match. Referring to FIG. 3, phase matching means that, where a first harmonic wave is generated at point A from light propagating through the core 41, and the harmonic wave leaks to the clad 42 with an angle $\alpha$, the cophasal surface of the first harmonic wave emitted at point A coincides with the cophasal surface of a second harmonic wave, which is emitted, after a unit period of time has elapsed, at point B at an angle $\alpha$. When phase matching occurs, Cherenkov radiation is generated. Where the refractive indices for a fundamental wave in the clad 42 and the core 41 are $n_S(\omega)$ and $n_G(\omega)$, respectively, and the refractive index for a second harmonic wave in the clad 42 is $n_S(2\omega)$, if the following condition is satisfied:

$$n_S(2\omega) > n_G(\omega) > n_S(\omega)$$

then phase matching of the generated second harmonic waves is accomplished thereby generating Cherenkov radiation. The above described fiber-type wavelength conversion technology is known in the art.

The commercial applications of second harmonic radiation have been widespread, and in particular, its use in reading optical disk is particularly important. To use second harmonic radiation for this commercial purpose, the light source and conversion module must be compact in size and operate at a high efficiency. Therefore, a semiconductor laser light source is convenient. Optical wavelength conversion modules, as shown in FIGS. 4(a) to 4(c) (all prior art), are used in the art to generate second harmonic light from a semiconductor laser light source 91. However, a problem with semiconductor laser light sources is the limited power output inherent in such devices. To accentuate the problem, to operate effectively, the conversion module must produce relatively high power output. The conversion module includes the light source 91, a collimating lens 92, which collimates laser light from the laser light source 91, a condenser lens 93, which converges the collimated laser light, and the above-mentioned fiber-type optical wavelength conversion element 94. Some prior art devices including a prism beam expander P having prisms $P_1$ and $P_2$ to change the shape of the beam before it enters the conversion element.

A conventional laser light source 91, as shown in FIGS. 5(a) and 5(b) (both prior art), emits laser light 96 from a waveguide opening 91a which has a rectangular section elongated in the transverse direction relative to that in the longitudinal direction. Thus, the angle of emission of the laser light is greater in the longitudinal direction than in the transverse direction with the result that the section 96a of the emitted laser light 96 has an elliptical shape elongated in the longitudinal direction. Generally, the aspect ratio of the laser light 96 is in the range of about 3/1 to 2/1. Therefore, the light beam converged by the condenser lens 93 on the input end face of the fiber-type optical wavelength conversion element 94, also has an elliptical shape elongated in the longitudinal direction.

However, the core of the fiber-type optical wavelength conversion element 94 has a circular cross-section. Thus, there is a discrepancy between the cross-section of the beam and the cross-section of core of the conversion element. This discrepancy results in a conversion of the light generated by the source because it does not all enter the core because of the noncircular beam section. Therefore, in a conventional optical wavelength conversion module, in order to efficiently guide all of the laser light beam 96 into the core of the optical wavelength conversion element 94, a prism beam expander P comprising a pair of prisms P1 and P2 is inserted, as shown in FIG. 4(a) so that the beam section is deformed from an elliptical to a circular shape.

An alternative means to produce a circular beam is to allow only the circular components of the section 96a of the laser light 96, which is indicated by a broken line in FIG. 5(b), to be extracted and applied to the element 94. The extraction of only the components of the circular portion can be done, for example, by making the aperture diameter of the condenser lens 93 smaller than that of the collimating lens 92, as shown in FIG. 4(b), or by making the angular aperture of the collimating lens 92 smaller than that of the semiconductor laser light source 91 in the longitudinal direction, as shown in FIG. 4(c).

However, each of the above described means for producing second harmonic light has a deficiency which significantly reduces its commercial usefulness. In the means depicted by the configuration of FIG. 4(a), the insertion of the prism beam expander P necessarily increases the size, weight and complexity of the module. Additionally, laser light is reflected by the surfaces (four surfaces in total) of the prisms P1 and P2 resulting in an overall loss of radiation energy before the beam enters the conversion element. These disadvantages are contrary to the object of miniaturizing a light source for an optical disk, and also results in a higher cost of the component and the ultimate product.

Inefficiencies are also apparent in the prior art configurations of FIGS. 4(b) and 4(c). Since only a portion of the laser light from the semiconductor laser light source 91 is transmitted to the element, the power of the emitted converted laser light is necessarily reduced compared to that which is the product of the entire source beam.

The power of the second harmonic which is emitted from the element 94 is proportional to the square of the power of the laser light guided into the element. Therefore, any power loss of the laser light before entering the conversion element results in a large reduction in the power of the emitted light. Thus, the overall generation efficiency of the second harmonic in conventional optical wavelength conversion modules is disadvantageously lowered.

It is the object of the invention to provide a small size optical wavelength conversion module which can generate a second harmonic with high conversion efficiency.

SUMMARY OF THE INVENTION

The optical wavelength conversion module is characterized in that the semiconductor laser light source emits a beam having a substantially circular shape. In particular, the beam has an aspect ratio of about 1.3 or less.

If the beam section of laser light is substantially circular, then the entire light beam which is converged on the circular input end face of a fiber-type optical wavelength conversion element has a substantially circular shape and can enter the core of the conversion element. Therefore, it is not necessary to deform the beam section into a circular shape or to extract only a portion of the laser beam to be applied to the core. The entire beam of laser light emitted from the source can be effectively used, resulting in a substantially lower power loss of the laser light. Thus, the generation efficiency of the second harmonic in the optical wavelength conversion module is significantly improved. The same semiconductor laser light sources can be more effectively used for this application, whereas before, the energy inefficiency of the system was impairing their usefulness. Also, since additional components such as a prism beam expander are not necessary, the optical wavelength conversion module can be miniaturized and manufactured at a low cost.

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

Hereinafter, the invention will be described in detail with reference to the accompanying drawings.

DETAILED DESCRIPTION OF THE PREFERRED EMBODIMENT

Figure 1A:
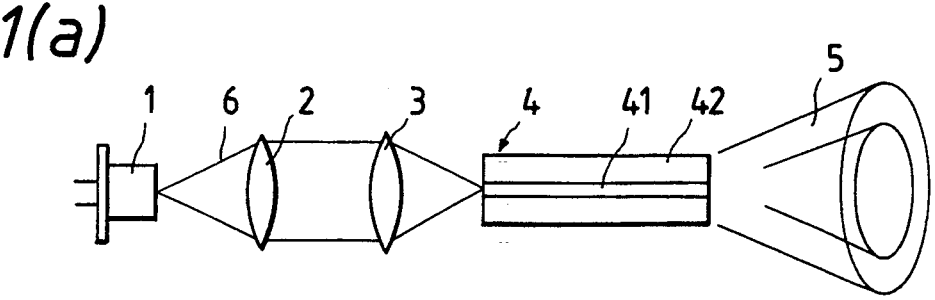
FIG. 1(a) is a schematic diagram showing the basic structure of an optical wavelength conversion module according to the present invention.

FIG. 1(a) is a diagram showing the basic structure of an optical wavelength conversion module according to the present invention. The optical wavelength conversion module is constructed so that laser light generated from a semiconductor laser light source 1 is collimated by a collimating lens 2 and then converged by a condenser lens 3 to be incident on a fiber-type optical wavelength conversion element 4. In order to minimize the diameters of the lenses, the angular aperture of the condenser lens 3 is substantially equal to the aperture of the fiber-type optical wavelength conversion element 4.

Figure 1B:
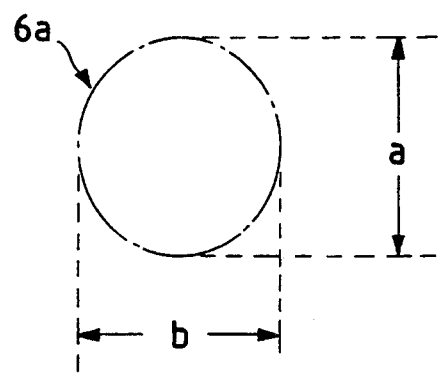
FIG. 1(b) shows the shape of the beam section of laser light which is obtained from a semiconductor laser light source used in the present invention.
Figure 2:
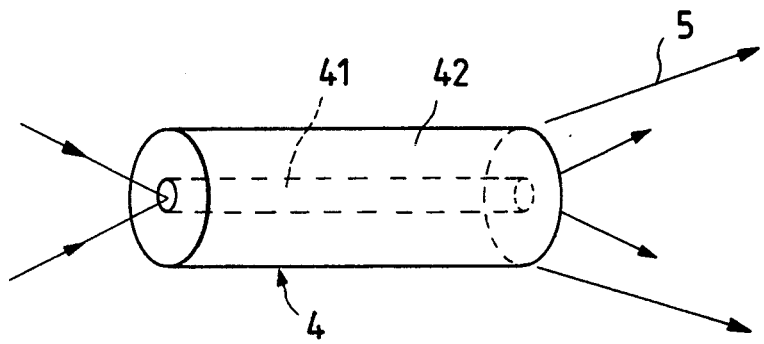
FIG. 2 is a schematic diagram illustrating the operating principle of a fiber-type optical wavelength conversion element.
Figure 3:
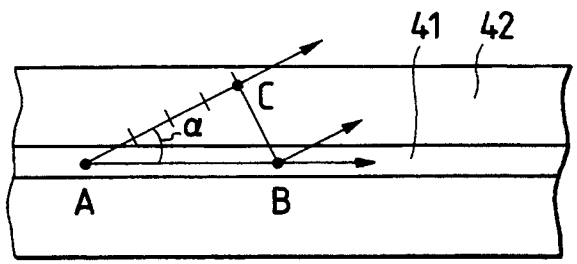
FIG. 3 is a schematic diagram illustrating Cherenkov radiation.

The semiconductor laser light source 1 of the present invention generates laser light 6 having a beam section 6a of substantially circular shape, see FIG. 1(b). The generated beam has a cross section having an elliptical component and a true circular component where the aspect ratio indicated by a ratio a/b of the dimension a to dimension b shown in FIG. 1(b) is about 1.3 or less. When the aspect ratio is greater than 1.3, the beam section 6a has such an accentuated elliptical shape that the laser light 6 cannot be efficiently guided into the core of the fiber-type optical wavelength conversion element 4 without substantial loss of power.

The fiber-type optical wavelength conversion element 4 comprises a core 41 having a circular section, and a clad 42 surrounding the core 41. The clad 42 is made of a material which has a refractive index lower than that of the material of the core 41. At least one of the clad 42 and core 41 is made of a known nonlinear optical material such as MNA or DAN.

In the fiber-type optical wavelength conversion element 4, when laser light enters from the input end face (the left end face in FIG. 1(a)) into the core 41, the laser light beam is converted and second harmonic (converted light) 5 is emitted from the light emitting end face (the right end face in FIG. 1(a)) to be radiated in a ring-like shaped beam. The emitted converted light passes through a wavelength filter (not shown) which blocks the fundamental wave, and is then collimated by a lens system (not shown) to be used for reading an optical disk, for example.

Next, specific examples of optical wavelength conversion modules of the invention will be described.

EXAMPLE 1

A cylindrical clad having an inner diameter of 1.0 μm, an outer diameter of 1.0 mm and a length of 50 mm was produced from SF15 glass (product of HOYA GLASS k.k.). After a melt of 3,5-dimetyl-1-(4-nitrophenyl)pyrazole (PRA) was sucked up into the capillary tube by capillary action, the melt of PRA was cooled to form a monocrystal starting from the end of the capillary tube by the Bridgeman method, thereby forming a core (a detailed production process is described in Japanese Laid-Open Patent Publication No. HEI3-111826). Thereafter, the element was cut so that the ends were perpendicular to the optical axis, to produce a fiber-type optical wavelength conversion element having a core diameter of 1.0 μm, a clad diameter of 1.0 mm and a length of 5 mm.

The fiber-type optical wavelength conversion element was then combined with a semiconductor laser device which generates laser light having a wavelength of 895 nm and an aspect ratio of 1.2, a collimating lens having a numerical aperture of 0.4, and a condenser lens having a numerical aperture of 0.5, thereby producing an optical wavelength conversion module having a structure shown in FIG. 1(a). The overall length of the optical wavelength conversion module was 35 mm.

When the semiconductor laser device of the optical wavelength conversion module was operated at the output level of 100 mW, the power of laser light emitted from the condenser lens was 65 mW and the converged spot was substantially circular. The power of the second harmonic emitted from the fiber-type optical wavelength conversion element was 50 μW.

EXAMPLE 2

The same procedures as Example 1 were repeated except that SF1 glass (product of HOYA GLASS k.k.) instead of SF15 glass was used as the material of the clad and DAN was used as the material of the core in place of PRA, to produce a fiber-type optical wavelength conversion element having a core diameter of 1.6 μm, a clad diameter of 1.0 mm and a length of 5 mm.

The fiber-type optical wavelength conversion element was then combined with a semiconductor laser device which generates laser light having a wavelength of 980 nm and an aspect ratio of 1.1, a collimating lens having a numerical aperture of 0.4, and a condenser lens having a numerical aperture of 0.5, thereby producing an optical wavelength conversion module having a structure shown in FIG. 1(a). The overall length of the optical wavelength conversion module was 35 mm.

When the semiconductor laser device of the optical wavelength conversion module was operated at the output level of 100 mW, the power of laser light emitted from the condenser lens was 65 mW and the converged spot was substantially circular. The power of the second harmonic emitted from the fiber-type optical wavelength conversion element was 45 μW.

EXAMPLE 3

The same procedures as Example 1 were repeated except that SF11 glass (product of HOYA GLASS k.k.) instead of SF15 glass was used as the material of the clad, to produce a fiber-type optical wavelength conversion element having a core diameter of 3.4 μm, a clad diameter of 1.0 mm and a length of 5 mm.

The fiber-type optical wavelength conversion element was then combined with a semiconductor laser device which generates laser light having a wavelength of 959 nm and an aspect ratio of 1.2, a collimating lens having a numerical aperture of 0.4, and a condenser lens having a numerical aperture of 0.5, thereby producing an optical wavelength conversion module having a structure shown in FIG. 1(a). The overall length of the optical wavelength conversion module was 35 mm.

When the semiconductor laser device of the optical wavelength conversion module was operated at the output level of 100 mW, the power of laser light emitted from the condenser lens was 65 mW and the converged spot was substantially circular. The power of the second harmonic emitted from the fiber-type optical wavelength conversion element was 250 μW.

EXAMPLE 4

The same procedures as Example 1 were repeated except that SF4 glass (product of HOYA GLASS k.k.) instead of SF15 glass was used as the material of the clad, to produce a fiber-type optical wavelength conversion element having a core diameter of 2.2 μm, a clad diameter of 1.0 mm and a length of 5 mm.

The fiber-type optical wavelength conversion element was then combined with a semiconductor laser device which generates laser light having a wavelength of 985 nm and an aspect ratio of 1.3, a collimating lens having a numerical aperture of 0.4 and a condenser lens having a numerical aperture of 0.5, thereby producing an optical wavelength conversion module having a structure shown in FIG. 1(a). The overall length of the optical wavelength conversion module was 35 mm.

When the semiconductor laser device of the optical wavelength conversion module was operated at the output level of 100 mW, the power of the laser light emitted from the condenser lens was 65 mW and the converged spot was substantially circular. The power of the second harmonic emitted from the fiber-type optical wavelength conversion element was 200 μW.

Comparison Example 1

Figure 4A:
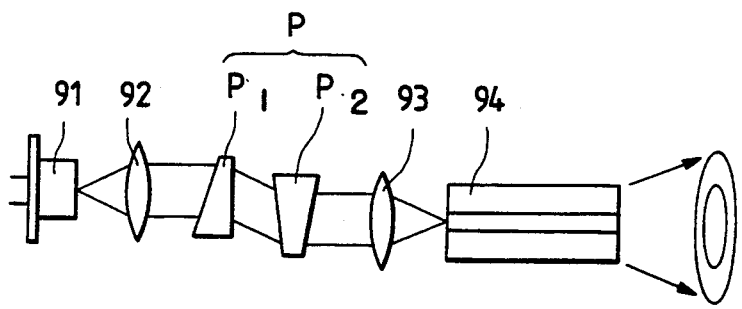
FIGS. 4(a)–4(c) are schematic diagrams showing prior art optical wavelength conversion modules.
Figure 4B:
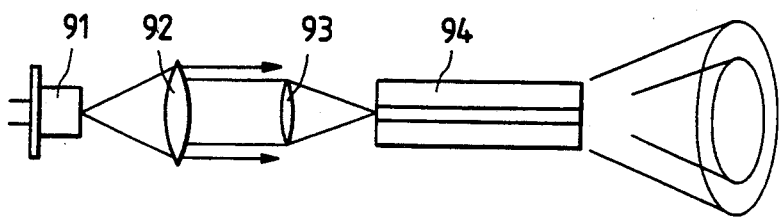

The fiber-type optical wavelength conversion element used in Example 1 was combined with a semiconductor laser device which generates laser light having a wavelength of 985 nm and an aspect ratio of 3, a collimating lens having a numerical aperture of 0.4, a prism beam expander, and a condenser lens having a numerical aperture of 0.5, thereby producing an optical wavelength conversion module having a structure shown in FIG. 4(a). The overall length of the optical wavelength conversion module was 60 mm.

When the semiconductor laser device of the optical wavelength conversion module was operated at the output level of 100 mW, the power of laser light emitted from the condenser lens was reduced to 50 mW, and also the power of the second harmonic emitted from the fiber-type optical wavelength conversion element was reduced to 30 μW.

Comparison Example 2

Figure 4C:
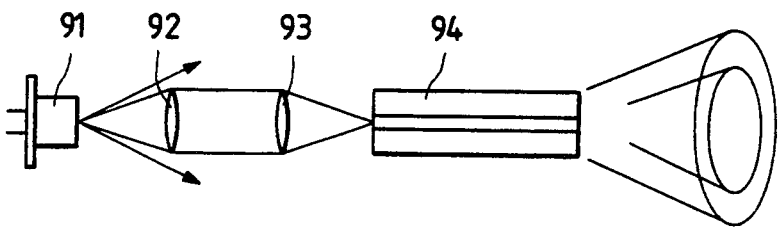
Figure 5A:
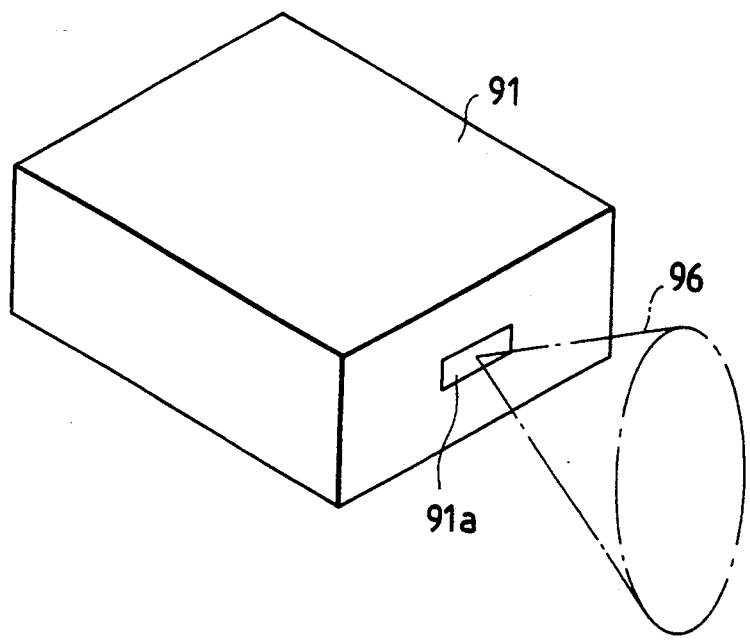
FIG. 5(a) is a diagram illustrating a prior art laser light source and the emitted beam.
Figure 5B:
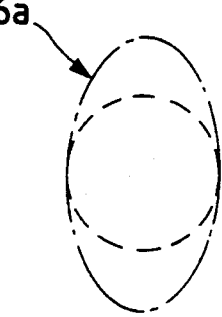
FIG. 5(b) is an illustration of the cross-section of the laser beam emitted from the laser light source of FIG. 5(a).

The fiber-type optical wavelength conversion element used in Example 1 was combined with a semiconductor laser device which generates laser light having a wavelength of 985 nm and an aspect ratio of 3, a collimating lens having a numerical aperture of 0.25, and a condenser lens having a numerical aperture of 0.5, thereby producing an optical wavelength conversion module having a structure shown in FIG. 4(c). The overall length of the optical wavelength conversion module was 35 mm.

When the semiconductor laser device of the optical wavelength conversion module was operated at the output level of 100 mW, the power of laser light emitted from the condenser lens was largely reduced to 35 mW, and also the power of the second harmonic emitted from the fiber-type optical wavelength conversion element was reduced to 15 μW.

As seen from the above examples, when the beam section of a semiconductor laser device has a substantially circular shape, it is possible to improve the generation efficiency of the second harmonic, and the optical wavelength conversion module can be reduced in size compared with a module using a prism beam expander.

In the embodiments described above, a coating of an antireflection film, may be applied to the end faces of the fiber-type optical wavelength conversion element to further increase the efficiency of the module.

As described above, according to the invention, the beam section of the semiconductor laser device has a substantially circular shape, thereby allowing the efficient conversion of the source light while maintaining the small size of the module.

While the invention has been described in connection with what is presently considered to be the most practical and preferred embodiments, it are to be understood that the invention is not to be limited to the disclosed embodiments, but on the contrary is intended to cover various modifications and equivalent arrangements included with the spirit and scope of the appended claims.

What is claimed is:

1. An optical wavelength conversion module comprising:
   a laser light source for emitting laser light having a substantially circular cross-section with an aspect ratio of at most about 1.3;
   a fiber-type optical wavelength conversion element having a core and a clad, wherein a refractive index of the clad is smaller than a refractive index of the core, and wherein at least one of the clad and the core is made of a nonlinear optical material;
   a condenser lens, having a numerical aperture of about 0.5, for converging the laser light emitted by the laser light source onto the core, such that the conversion element generates optically wavelength-converted light; and
   a collimating lens, having a numerical aperture of about 0.4, for collimating the laser light emitted by the laser light source and directing the laser light to the condenser lens.

2. An optical wavelength conversion module which is about 35 mm in length, the optical wavelength conversion module comprises:
   a laser light source for emitting laser light having a substantially circular cross-section with an aspect ratio of about 1.2;
   a fiber-type optical wavelength conversion element which is about 5 mm in length, the fiber-type optical wavelength conversion element comprises:
      a core, having a diameter of about 1.0 μm, made of 3,5-dimetyl-1-(4-nitrophenyl) pyrazole; and
      a clad, having a outer diameter of about 1.0 mm, made of glass, wherein a refractive index of the clad is smaller than a refractive index of the core; and
   a lens for converging the laser light emitted by the laser light source onto the core, such that the conversion element generates optically wavelength-converted light.

3. An optical wavelength conversion module comprising:
   a laser light source for emitting laser light having a substantially circular cross-section with an aspect ratio of at most about 1.3;
   a fiber-type optical wavelength conversion element comprising:
      a core made of 3,5-dimetyl-1-(4-nitrophenyl) pyrazole; and
      a clad made of glass, wherein a refractive index of the clad is smaller than a refractive index of the core; and
   a lens for converging the laser light emitted from the laser light source onto the core, such that the conversion element generates optically wavelength-converted light.

4. An optical wavelength conversion module which is about 35 mm in length, the optical wavelength conversion module comprises:
   a laser light source for emitting laser light having a substantially circular cross-section with an aspect ratio of about 1.1;
   a fiber-type optical wavelength conversion element which is about 5 mm in length, the fiber-type optical wavelength conversion element comprises:
      a core, having a diameter of about 1.6 μm, made of 4-dimetylamino-3-acetoamidonitrobenzene; and
      a clad, having a outer diameter of about 1.0 mm, made of glass, wherein a refractive index of the clad is smaller than a refractive index of the core; and
   a lens for converging the laser light emitted by the laser light source onto the core, such that the conversion element generates optically wavelength-converted light.

* * * * *